United States Patent
Suda

(10) Patent No.: US 6,741,667 B1
(45) Date of Patent: May 25, 2004

(54) DEVICE AND METHOD FOR PERCH CHANNEL RECEPTION FOR MOBILE RADIO COMMUNICATION TERMINAL ACCORDING TO CDMA

(75) Inventor: Kei Suda, Tokyo (JP)

(73) Assignee: NEC Electronics Corporation, Kawasaki (JP)

( * ) Notice: Subject to any disclaimer, the term of this patent is extended or adjusted under 35 U.S.C. 154(b) by 0 days.

(21) Appl. No.: 09/411,233

(22) Filed: Oct. 4, 1999

(30) Foreign Application Priority Data

Oct. 6, 1998 (JP) .......................................... 10-283875

(51) Int. Cl.[7] ............................................... H04L 7/00
(52) U.S. Cl. ...................... 375/354; 370/335; 370/342; 370/503; 375/343
(58) Field of Search ............................... 375/142, 150, 375/130, 343, 354, 350, 359, 364, 367; 370/335, 342, 441, 503, 515

(56) References Cited

U.S. PATENT DOCUMENTS

| | | | | |
|---|---|---|---|---|
| 5,673,260 A | * | 9/1997 | Umeda et al. | 370/342 |
| 5,873,047 A | * | 2/1999 | Nakano et al. | 455/561 |
| 6,011,787 A | * | 1/2000 | Nakano et al. | 370/335 |
| 6,144,650 A | * | 11/2000 | Watanabe et al. | 370/335 |
| 6,161,016 A | * | 12/2000 | Yarwood | 455/445 |
| 6,208,632 B1 | * | 3/2001 | Kowalski et al. | 370/335 |
| 6,314,090 B1 | * | 11/2001 | Nakamura et al. | 370/335 |
| 6,396,870 B1 | * | 5/2002 | Suda | 375/152 |

FOREIGN PATENT DOCUMENTS

EP 0954124 A2 11/1999
JP 10-190619 7/1998

OTHER PUBLICATIONS

Japanese Office Action dated Aug. 14, 2001 with partial English translation.
British Search Report dated Mar. 27, 2000.

* cited by examiner

Primary Examiner—Jean B. Corrielus
(74) Attorney, Agent, or Firm—McGinn & Gibb, PLLC

(57) ABSTRACT

A perch channel reception device of a mobile radio communication terminal for successively receiving perch channels of base stations around the terminal includes a delay profile generator, a base station scrambling timing detector, a timing corrector, a correlator with time window, and a perch channel demodulator. The delay profile generator detects frame boundary symbols included in a received modulated radio wave and thereby generates a delay profile. The base station scrambling timing detector detects scrambling timing of each base station based on the delay profile. Thereafter, a base station is selected from the base stations one by one as the object of perch channel reception. The timing corrector calculates corrected scrambling timing of the selected base station using a timing correction supplied from the correlator with time window and the scrambling timing of the selected base station based on the delay profile. The correlator with time window takes the correlation between the received modulated radio wave and the scrambling code of the selected base station, with respect to a plurality of comparison starting times in a time window around the corrected scrambling timing, and thereby generates correlation data and the timing correction. The perch channel demodulator demodulates the correlation data into logic data including information concerning the selected base station.

13 Claims, 10 Drawing Sheets

FIG. 2
PRIOR ART

SCRAMBLING TIMING OF BASE STATION

| 1 | 2 | 3 | 4 | ... | 199999 | 200000 | 1 | 2 | ... | 199999 | 200000 | 1 | 2 |

|←——— THE FIRST BASE STATION (50 ms) ———→|←——— THE SECOND BASE STATION (50 ms) ———→|

↕ 0.6 CHIPS        ↕ 1.2 CHIPS

SCRAMBLING TIMING OF MOBILE TERMINAL
(ERROR: +3 PPM)

| 1 | 2 | 3 | 4 | ... | 199999 | 200000 | 1 | 2 | ... | 199999 | 200000 | 1 | 2 |

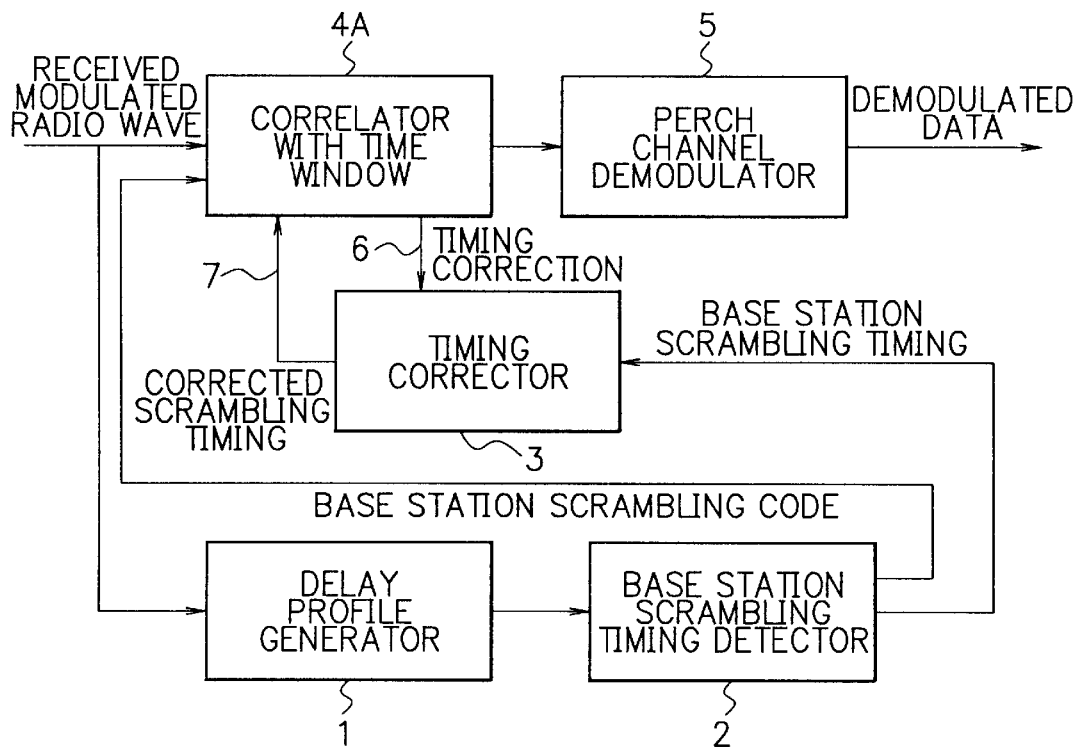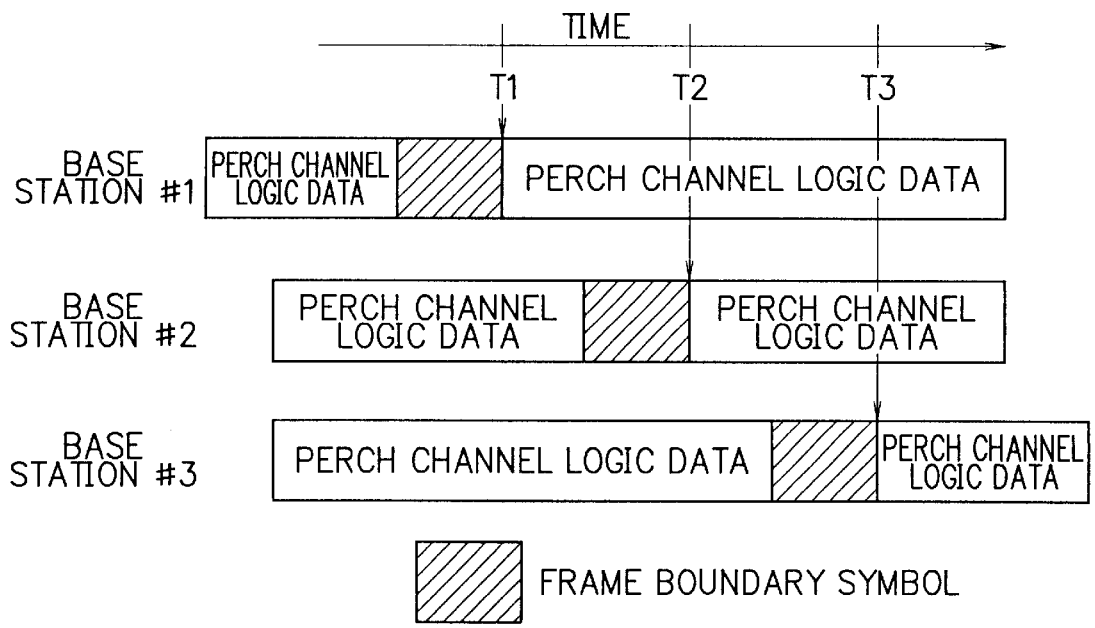

DEVICE AND METHOD FOR PERCH CHANNEL RECEPTION FOR MOBILE RADIO COMMUNICATION TERMINAL ACCORDING TO CDMA

BACKGROUND OF THE INVENTION

The present invention relates to a perch channel reception device and a perch channel reception method of a mobile radio communication terminal which executes radio communication according to CDMA (Code Division Multiple Access).

Description of the Prior Art

Mobile radio communication terminals such as portable cellular phones have become widely available these days. Generally, a mobile radio communication terminal has to search for base stations around the mobile radio communication terminal and obtain base station information (information with regard to a base station, such as present time of the base station, an ID of the base station, transmission power of the base station, etc.) which is transmitted by each of the base stations, when power of the mobile radio communication terminal is turned on or at predetermined time periods.

The base station information which is transmitted by a base station so as to be received by mobile radio .communication terminals in its own base station cell (area) is included in a channel which is called "perch channel". Therefore, the mobile radio communication terminal has to receive and demodulate the perch channel of each of the base stations first, in order to obtain the base station information of the base stations.

In a mobile radio communication terminal which executes radio communication according to CDMA (Code Division Multiple Access), information transmitted by a desired base station can be demodulated from multiplexed data (that is, a received radio wave which has been modulated according to CDMA and transmitted by base stations) by taking the correlation between the received modulated radio wave and a predetermined scrambling code of the base station in sync with predetermined scrambling timing of the base station.

The modulated radio wave which is received by the mobile radio communication terminal includes frame boundary symbols of the base stations around the mobile radio communication terminal, in which each frame boundary symbol indicates information concerning the scrambling timing of a base station and the type of the scrambling code used by the base station. The mobile radio communication terminal can detect the scrambling timing and the scrambling code of the perch channel of each base station, by detecting the frame boundary symbols included in the received modulated radio wave.

After the perch channel reception of the base stations around the mobile radio communication terminal is completed, the mobile radio communication terminal starts next procedure for establishing communication with the most suitable one of the base station. After the communication between the mobile radio communication terminal and the most suitable base station is started, the mobile radio communication terminal periodically executes the perch channel reception of base stations around the mobile radio communication terminal, while executing the communication with the most suitable base station.

FIG. 1 is a block diagram showing a conventional perch channel reception device of a mobile radio communication terminal according to CDMA, for executing the perch channel reception with respect to base stations around the mobile radio communication terminal.

The perch channel reception device shown in FIG. 1 includes a delay profile generator 1, a base station scrambling timing detector 2, a correlator with time window 4, and a perch channel demodulator 5.

The delay profile generator 1 detects frame boundary symbols which are included in a received modulated radio wave, and thereby generates a delay profile of base stations around the mobile radio communication terminal. There are a plurality of base stations around the mobile radio communication terminal, and thus the delay profile generated by the delay profile generator 1 includes a plurality of peaks corresponding to the base stations around the mobile radio communication terminal. The base station scrambling timing detector 2 detects scrambling timing of each of the base stations based on the delay profile which has been generated by the delay profile generator 1 and thereby generates a base station scrambling timing table which indicates the detected scrambling timing of each of the base stations around the mobile radio communication terminal. Thereafter, the base station scrambling timing detector 2 selects a base station from the base stations one by one, and informs the timing corrector 3 about the scrambling timing of the selected base station (i.e. base station scrambling timing). The base station scrambling timing detector 2 also determines the type of the scrambling code used by the selected base station based on the frame boundary symbol corresponding to the selected base station, and informs the correlator with time window 4A about the type of the scrambling code used by the selected base station (i.e. the type of base station scrambling code). The correlator with time window 4, which is provided with a time window of a fixed size, takes the correlation between (compares) the received modulated radio wave and the base station scrambling code (i.e. the scrambling code of the selected base station which has been detected by the base station scrambling timing detector 2), with respect to a plurality of comparison starting times (that is, the time when the comparison between the received modulated radio wave and the base station scrambling code is started) in the fixed time window around the base station scrambling timing, and thereby generates correlation data. The perch channel demodulator 5 demodulates the correlation data which has been generated by the correlator with time window 4 into logic data which indicates the base station information of the selected base station such as present time of the selected base station, an ID of the selected base station, transmission power of the selected base station, etc.

As described above, in the conventional perch channel reception device of a mobile radio communication terminal according to CDMA, the correlator with time window 4 generates correlation data between the received modulated radio wave and the base station scrambling code, with respect to a plurality of comparison starting times in the fixed time window around the base station scrambling timing.

Generally, each base station is provided with a high precision oscillator, while precision of the oscillator of each mobile radio communication terminal is not high enough. The oscillation frequency of the oscillator of a mobile radio communication terminal has an error of the order of PPM due to variations in the environment in which the mobile radio communication terminal is used, limited size and price of the mobile radio communication terminal, etc. Further, in the conventional perch channel reception device of FIG. 1, there is a large time difference between the generation of the delay profile and the completion of the perch channel reception of the base stations around the mobile radio communication terminal. The perch channel reception becomes impossible if the scrambling timing used by the mobile radio communication terminal is shifted by 1 chip (chip: a time period corresponding to one scrambled code when logic data is scrambled) in comparison with real scrambling timing of the selected base station. Therefore, the conventional perch channel reception device has to be provided with a time window of a very large size in order to absorb and compensate the shift of the scrambling timing during the perch channel reception of all the base stations.

In the following, the shift of the scrambling timing between the base station and the mobile radio communication terminal will be explained in detail referring to FIG. 2. Incidentally, the following explanation will be given with respect to a case where the number of base stations around the mobile radio communication terminal is three, the scrambling frequency (chip frequency) is 4 MHz, and reception time necessary for the perch channel reception of one base station is 50 ms, for the sake of simplicity. Referring to FIG. 2, the scrambling code proceeds 200000 chips in the 50 ms reception time for perch channel reception of a base station. Thereafter perch channel reception of the next base station is started. If we assume the oscillation frequency error of the oscillator of the mobile radio communication terminal is +3 PPM, the scrambling timing shift of the mobile radio communication terminal after the 50 ms perch channel reception becomes 0.6 chips, as shown in FIG. 2. In the same way, the scrambling timing shift becomes as large as 1.2 chips at the point when perch channel reception of the third base station is started. In CDMA, perch channel reception (signal demodulation) generally becomes impossible if the scrambling timing shift grows 1 chip, therefore, the correlator with time window 4 has to be provided with the time window in order to absorb and compensate the scrambling timing shift. Generally, the number of base stations around a mobile radio communication terminal is 5~20, therefore, if we assume the scrambling frequency (chip frequency) is 4 MHz and the perch channel reception time for one base station is 50 ms and the oscillator frequency error of the mobile radio communication terminal is ±3 PPM, the correlator with time window 4 has to be provided with a time window that can cover +12 chips.

The correlator with time window 4 is usually implemented by a plurality of correlators, and generally, the number of the correlators is proportional to the size of the time window of the correlator with time window 4. Therefore, in the conventional perch channel reception device, the correlator with time window 4 has to be provided with a large number of correlators in order to absorb and compensate the large scrambling timing shift, and thus circuit scale of the correlator with time window 4 is necessitated to be considerably large. On the other hand, if we limit the circuit scale of the correlator with time window 4, frequency precision of the oscillator of the mobile radio communication terminal is required to be raised, and thus manufacturing cost and the price of the mobile radio communication terminal is necessitated to be high.

SUMMARY OF THE INVENTION

It is therefore the primary object of the present invention to provide a perch channel reception device of a mobile radio communication terminal according to CDMA, by which the shift of the scrambling timing can be absorbed and compensated by means of small circuit composition and thereby the perch channel reception can be executed successfully, even if a considerable amount of difference occurred between scrambling frequencies (oscillator frequencies) of the mobile radio communication terminal and the base station.

Another object of the present invention is to provide a perch channel reception method of a mobile radio communication terminal according to CDMA, by which the shift of the scrambling timing can be absorbed and compensated by means of small circuit composition and thereby the perch channel reception can be executed successfully, even if a considerable amount of difference occurred between scrambling frequencies of the mobile radio communication terminal and the base station.

Another object of the present invention is to provide a computer-readable record medium storing a program for instructing a computer or a DSP (digital signal processor) of a mobile radio communication terminal according to CDMA to execute processes for successively receiving perch channels transmitted by base stations around the mobile radio communication terminal, by which the shift of the scrambling timing can be absorbed and compensated by means of small circuit composition and thereby the perch channel reception can be executed successfully, even if a considerable amount of difference occurred between scrambling frequencies of the mobile radio communication terminal and the base station.

In accordance with a first aspect of the present invention, there is provided a perch channel reception device of a mobile radio communication terminal according to CDMA for successively receiving perch channels transmitted by base stations around the mobile radio communication terminal. In the perch channel reception device, on each completion of perch channel reception of a base station, the time difference between real scrambling timing of the currently received base station and scrambling timing which has been used for executing perch channel reception of the currently received base station is detected, and a timing correction is calculated as the accumulation of the time difference, and thereby scrambling timing of the next base station which has been detected based on a delay profile is corrected using the timing correction. Perch channel reception of the next base station is executed using the corrected scrambling timing of the next base station.

In accordance with a second aspect of the present invention, in the first aspect, the time difference between the real scrambling timing of the currently received base station and the scrambling timing which has been used for executing perch channel reception of the currently received base station is detected by a correlator means with time window. The correlator means with time window generates correlation data with respect to the currently received base station by taking the correlation between a received modulated radio wave and scrambling code of the currently received base station with respect to a plurality of comparison starting times in a time window around the corrected scrambling timing which is used for the perch channel reception of the currently received base station.

In accordance with a third aspect of the present invention, in the second aspect, the perch channel reception device comprises a timing corrector means for calculating the corrected scrambling timing of the next base station using the scrambling timing of the next base station which has been detected based on the delay profile and the accumulation of the time difference detected by the correlator means with time window, and supplying the corrected scrambling timing of the next base station to the correlator means with time window so as to be used for the perch channel reception of the next base station.

In accordance with a fourth aspect of the present invention, in the first aspect, the perch channel reception device comprises a delay profile generator means, a base station scrambling timing detector means, a base station scrambling code detector means, a sequencer means, a timing corrector means, a correlator means with time window, and a perch channel demodulator means. The delay profile generator means detects frame boundary symbols which are included in a received modulated radio wave and thereby generates the delay profile of base stations around the mobile radio communication terminal. The base station scrambling timing detector means detects scrambling timing of each of the base stations based on the delay profile which has been generated by the delay profile generator means. The base station scrambling code detector means detects the type of scrambling code of each of the base stations based on the frame boundary symbols which have been detected by the delay profile generator means. The sequencer means selects a base station from the base stations one by one as the object of perch channel reception. The timing corrector means calculates corrected scrambling timing of the selected base station using the scrambling timing of the selected base station which has been detected by the base station scrambling timing detector means and the timing correction. The correlator means with time window takes the correlation between the received modulated radio wave and the scrambling code of the selected base station which has been detected by the base station scrambling code detector means, with respect to a plurality of comparison starting times in a time window around the corrected scrambling timing of the selected base station, and thereby generates correlation data with respect to the selected base station. When perch channel reception of the selected base station is completed, the correlator means with time window detects a time difference between real scrambling timing and the corrected scrambling timing of the selected base station, and thereby calculates a time difference between the real scrambling timing of the selected base station and the scrambling timing of the selected base station which has been detected by the base station scrambling timing detector means, and supplies the time difference to the timing corrector means as the timing correction. The perch channel demodulator means demodulates the correlation data generated by the correlator means with time window into logic data including information concerning the selected base station.

In accordance with a fifth aspect of the present invention, in the fourth aspect, the correlator means with time window includes three or more correlators, a correlation intensity comparator means, an output selector means, and an accumulator means. Different comparison starting times in the time window around the corrected scrambling timing of the selected base station are set to the three or more correlators. Each correlator takes the correlation between the received modulated radio wave and the scrambling code of the selected base station in sync with its comparison starting time, and thereby outputs correlation data and correlation intensity. The correlation intensity comparator means executes comparison between the correlation intensity supplied from the correlators, selects one correlator having the largest correlation intensity, and outputs a selection signal which designates the selected correlator. The correlation intensity comparator means also outputs timing shift data which indicates the time difference between real scrambling timing and the corrected scrambling timing of the selected base station. The output selector means, which is supplied with the correlation data from the correlators, selects correlation data that is supplied from the correlator designated by the selection signal supplied from the correlation intensity comparator means, and outputs the selected correlation data to the perch channel demodulator means. The accumulator means accumulates the timing shift data supplied from the correlation intensity comparator means, and supplies the accumulated timing shift to the timing corrector means as the timing correction.

In accordance with a sixth aspect of the present invention, in the fifth aspect, each of the correlators included in the correlator means with time window is implemented by a correlator of correlator bank type.

In accordance with a seventh aspect of the present invention, in the fifth aspect, each of the correlators included in the correlator means with time window is implemented by a correlator of matched filter type.

In accordance with an eighth aspect of the present invention, in the fourth aspect, the timing corrector means is implemented by an adder for adding the timing correction supplied from the correlator means with time window to the scrambling timing of the selected base station which has been detected by the base station scrambling timing detector means.

In accordance with a ninth aspect of the present invention, there is provided a perch channel reception method of a mobile radio communication terminal according to CDMA for successively receiving perch channels transmitted by base stations around the mobile radio communication terminal. In the perch channel reception method, on each completion of perch channel reception of a base station, the time difference between real scrambling timing of the currently received base station and scrambling timing which has been used for executing perch channel reception of the currently received base station is detected, and a timing correction is calculated as the accumulation of the time difference, and thereby scrambling timing of the next base station which has been detected based on a delay profile is corrected using the timing correction. Perch channel reception of the next base station is executed using the corrected scrambling timing of the next base station.

In accordance with a tenth aspect of the present invention, in the ninth aspect, the perch channel reception method comprises a delay profile generation step, a base station scrambling timing detection step, a base station scrambling code detection step, a selection step, a timing correction step, a perch channel reception step, a timing correction calculation step, and a perch channel demodulation step. In the delay profile generation step, frame boundary symbols which are included in a received modulated radio wave is detected and thereby the delay profile of base stations around the mobile radio communication terminal is generated. In the base station scrambling timing detection step, scrambling timing of each of the base stations is detected based on the delay profile which has been generated in the delay profile generation step. In the base station scrambling code detection step, the type of scrambling code of each of the base stations is detected based on the frame boundary symbols which have been detected in the delay profile generation step. In the selection step, a base station is selected from the base stations one by one as the object of perch channel reception. In the timing correction step, corrected scrambling timing of the selected base station is calculated using the scrambling timing of the selected base station which has been detected in the base station scrambling timing detection step and the timing correction. In the perch channel reception step, the correlation between the received modulated radio wave and the scrambling code of the selected base station which has been detected in the base station scrambling code detection step is taken with respect to a plurality of comparison starting times in a time window around the corrected scrambling timing of the selected base station, and thereby correlation data with respect to the selected base station is generated. In the timing correction calculation step, a time difference between real scrambling timing and the corrected scrambling timing of the selected base station is detected as a result of the perch channel reception step and thereby the timing correction, which indicates the time difference between the real scrambling timing of the selected base station and the scrambling timing of the selected base station which has been detected in the base station scrambling timing detection step, is calculated when the perch channel reception step with respect to the selected base station is completed. In the perch channel demodulation step, the correlation data generated in the perch channel reception step is demodulated into logic data including information concerning the selected base station.

In accordance with an eleventh aspect of the present invention, there is provided a computer-readable record medium storing a program for instructing a computer or a DSP (digital signal processor) of a mobile radio communication terminal according to CDMA to execute processes for successively receiving perch channels transmitted by base stations around the mobile radio communication terminal. In the processes, on each completion of perch channel reception of a base station, the time difference between real scrambling timing of the currently received base station and scrambling timing which has been used for executing perch channel reception of the currently received base station is detected, and a timing correction is calculated as the accumulation of the time difference, and thereby scrambling timing of the next base station which has been detected based on a delay profile is corrected using the timing correction. Perch channel reception of the next base station is executed using the corrected scrambling timing of the next base station.

In accordance with a twelfth aspect of the present invention, in the eleventh aspect, the processes include a delay profile generation step, a base station scrambling timing detection step, a base station scrambling code detection step, a selection step, a timing correction step, a perch channel reception step, a timing correction calculation step, and a perch channel demodulation step. In the delay profile generation step, frame boundary symbols which are included in a received modulated radio wave is detected and thereby the delay profile of base stations around the mobile radio communication terminal is generated. In the base station scrambling timing detection step, scrambling timing of each of the base stations is detected based on the delay profile which has been generated in the delay profile generation step. In the base station scrambling code detection step, the type of scrambling code of each of the base stations is detected based on the frame boundary symbols which have been detected in the delay profile generation step. In the selection step, a base station is selected from the base stations one by one as the object of perch channel reception. In the timing correction step, corrected scrambling timing of the selected base station is calculated using the scrambling timing of the selected base station which has been detected in the base station scrambling timing detection step and the timing correction. In the perch channel reception step, the correlation between the received modulated radio wave and the scrambling code of the selected base station which has been detected in the base station scrambling code detection step is taken with respect to a plurality of comparison starting times in a time window around the corrected scrambling timing of the selected base station, and thereby correlation data with respect to the selected base station is generated. In the timing correction calculation step, a time difference between real scrambling timing and the corrected scrambling timing of the selected base station is detected as a result of the perch channel reception step and thereby the timing correction, which indicates the time difference between the real scrambling timing of the selected base station and the scrambling timing of the selected base station which has been detected in the base station scrambling timing detection step, is calculated when the perch channel reception step with respect to the selected base station is completed. In the perch channel demodulation step, the correlation data generated in the perch channel reception step is demodulated into logic data including information concerning the selected base station.

BRIEF DESCRIPTION OF THE DRAWINGS

The objects and features of the present invention will become more apparent from the consideration of the following detailed description taken in conjunction with the accompanying drawings, in which:

FIG. 2 is a schematic diagram showing the shift of the scrambling timing between the base station and the mobile radio communication terminal;

FIG. 3 is a block diagram showing a perch channel reception device of a mobile radio communication terminal according to CDMA, in accordance with an embodiment of the present invention;

FIG. 4 is a timing chart showing scrambling timing of a perch channel of each base station in the case where there are three base stations around the mobile radio communication terminal;

DESCRIPTION OF THE PREFERRED EMBODIMENTS

Figure 1:
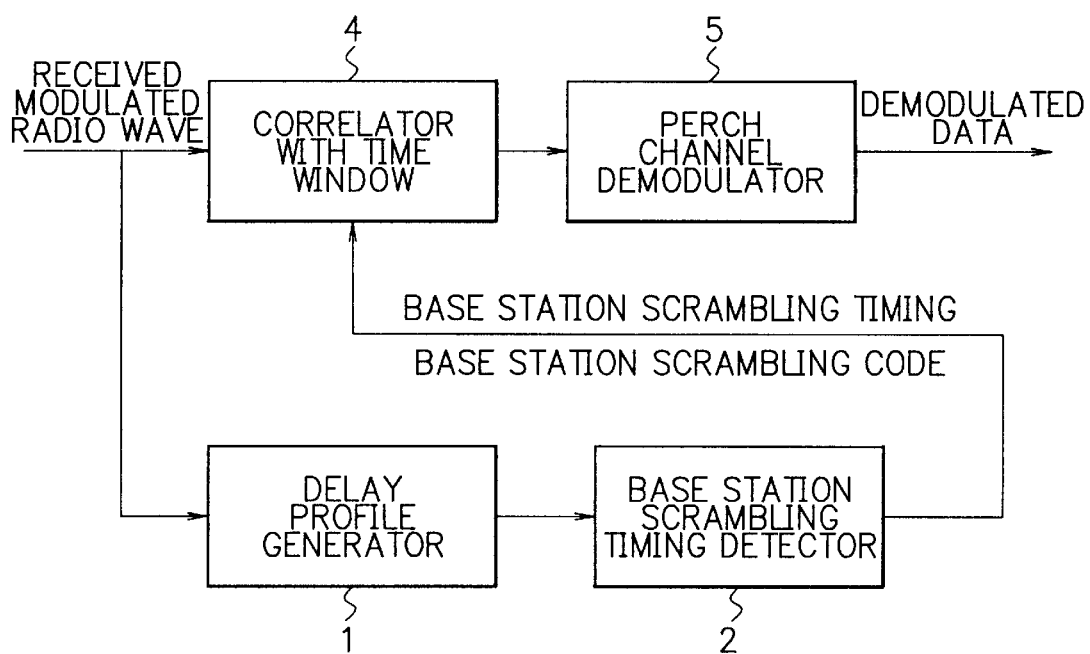
FIG. 1 is a block diagram showing a conventional perch channel reception device of a mobile radio communication terminal according to CDMA.

Referring now to the drawings, a description will be given in detail of preferred embodiments in accordance with the present invention.

FIG. 3 is a block diagram showing a perch channel reception device of a mobile radio communication terminal according to CDMA, in accordance with an embodiment of the present invention, which executes perch channel reception with respect to base stations around the mobile radio communication terminal. In FIG. 3, the same reference characters as those of FIG. 1 designate the same or corresponding parts to those of FIG. 1.

The perch channel reception device of FIG. 3 comprises a delay profile generator 1, a base station scrambling timing detector 2, a correlator with time window 4A, and a perch channel demodulator 5, similarly to the conventional perch channel reception device of FIG. 1. The perch channel reception device of FIG. 3 further comprises a timing corrector 3.

The delay profile generator 1 detects frame boundary symbols which are included in a received modulated radio wave, and thereby generates a delay profile of base stations around the mobile radio communication terminal. There are a plurality of base stations around the mobile radio communication terminal, and thus the delay profile generated by the delay profile generator 1 includes a plurality of peaks corresponding to the base stations around the mobile radio communication terminal. The base station scrambling timing detector 2 detects scrambling timing of each of the base stations based on the delay profile which has been generated by the delay profile generator 1 and thereby generates a base station scrambling timing table which indicates the detected scrambling timing of each of the base stations around the mobile radio communication terminal. Thereafter, the base station scrambling timing detector 2 selects a base station from the base stations one by one, and informs the timing corrector 3 about the scrambling timing of the selected base station (i.e. base station scrambling timing). The base station scrambling timing detector 2 also determines the type of the scrambling code used by the selected base station based on the frame boundary symbol corresponding to the selected base station, and informs the correlator with time window 4A about the type of the scrambling code used by the selected base station (i.e. the type of base station scrambling code).

The timing corrector 3 calculates corrected scrambling timing 7 of the selected base station using the base station scrambling timing supplied from the base station scrambling timing detector 2 and a timing correction 6 which is supplied from the correlator with time window 4A, and supplies the corrected scrambling timing 7 to the correlator with time window 4A.

The correlator with time window 4A, which is provided with a time window of a fixed size, takes the correlation between (compares) the received modulated radio wave and the base station scrambling code (i.e. the scrambling code of the selected base station which has been detected by the base station scrambling timing detector 2), with respect to a plurality of (5, for example) comparison starting times (that is, the time when the comparison between the received modulated radio wave and the base station scrambling code is started) in the fixed time window around the corrected scrambling timing 7 supplied from the timing corrector 3, and thereby generates correlation data and the timing correction 6. The center of the time window of the correlator with time window 4A is the corrected scrambling timing 7, differently from the case of the correlator with time window 4 of the conventional perch channel reception device of FIG. 1 in which the center of the time window is the base station scrambling timing detected by the base station scrambling timing detector 2.

The perch channel demodulator 5 demodulates the correlation data which has been generated by the correlator with time window 4A into logic data which indicates the base station information of the selected base station such as present time of the selected base station, an ID of the selected base station, transmission power of the selected base station, etc.

The delay profile generator 1 is implemented by, for example, one or more LSIs or FPGAs (Field Programmable Gate Arrays). The base station scrambling timing detector 2 is implemented by, for example, an LSI or a DSP (Digital Signal Processor). The timing corrector 3 is implemented by, for example, an adder. The correlator with time window 4A is implemented by, for example, one or more LSIs or FPGAs. The perch channel demodulator 5 is implemented by, for example, an LSI or a DSP. Incidentally, it is also possible to implement the components of the perch channel reception device shown in FIG. 3, by a DSP and appropriate software which is executed by the DSP.

As mentioned above, the delay profile generator 1 and the base station scrambling timing detector 2 are provided with functions for detecting the scrambling timing of each of the base stations around the mobile radio communication terminal using the frame boundary symbols which are included in the perch channels of modulated radio waves transmitted by the base stations.

FIG. 4 is a timing chart showing the scrambling timing of the perch channel of each of the base stations, in the case where there are three base stations around the mobile radio communication terminal. Each base station packs logic data which includes the base station information ("perch channel logic data" in FIG. 4) in the perch channel, and inserts a frame boundary symbol at the rear end of each perch channel logic data. The next logic data is packed after the frame boundary symbol. The frame boundary symbols are inserted in the perch channel at predetermined time intervals. FIG. 4 is showing the composition of the perch channel of each base station #1, #2 and #3 in the case where the scrambling timing of each base station #1, #2 and #3 is T1, T2 and T3, respectively. The modulated radio wave received by the mobile radio communication terminal includes the three perch channels of the three base stations #1, #2 and #3.

Figure 5:
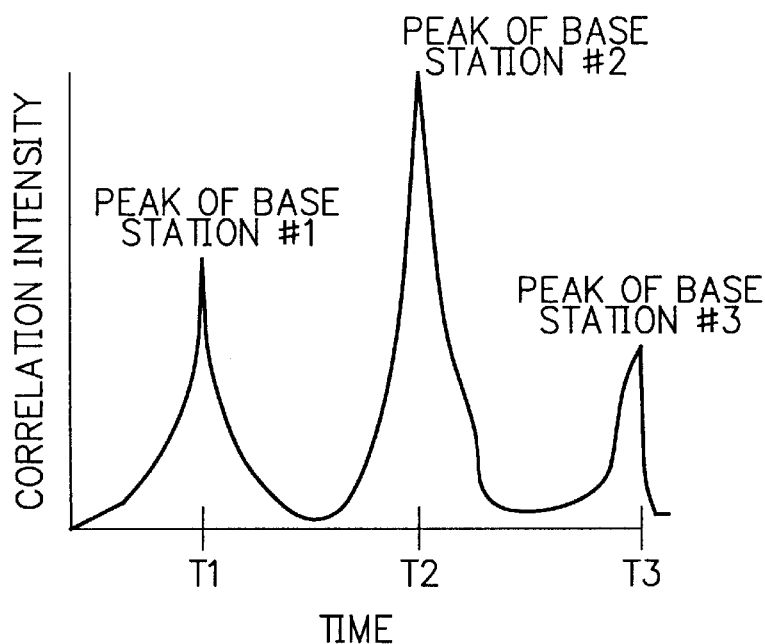
FIG. 5 is a graph showing an example of a delay profile which is generated by a delay profile generator of the perch channel reception device of FIG. 3.

FIG. 5 is a graph showing an example of a delay profile which is generated by the delay profile generator 1 by detecting the frame boundary symbols included in the perch channels transmitted by three base stations #1, #2 and #3. Referring to FIG. 5, three peaks (of correlation intensity between the modulated radio wave and the frame boundary symbol) corresponding to the three base stations #1, #2 and #3 can be seen at times T1, T2 and T3. The base station scrambling timing detector 2 detects the peaks of the correlation intensity in time, and thereby detects the scrambling timing of each base station #1, #2 and #3.

Incidentally, although the three base stations corresponding to the three peaks of the delay profile has been referred to as "base stations #1, #2 and #3", the three base stations are unidentified base stations at this stage. The three base stations will be identified when the perch channel reception with respect to the three base stations is completed. More precisely, there are cases where one or more peaks of the delay profile are caused by noise etc. and there are no real base stations corresponding to the peaks. Whether a peak of the delay profile is caused by a base station or not is found when perch channel reception corresponding to the peak is completed. However, the description hereafter will be given on the assumption that every peak of the delay profile is caused by a real base station, for the sake of simplicity.

The base station scrambling timing detector 2 also operates as a sequencer. The base station scrambling timing detector 2 selects a base station from the base stations (that is, selects a peak from the peaks) one by one as the object of perch channel reception, and informs the timing corrector 3 about the detected scrambling timing of the selected base station (base station scrambling timing). The perch channel reception of the base stations is executed according to the order that is determined by the selection by the sequencer (base station scrambling timing detector 2).

The base station scrambling timing detector 2 also operates as a scrambling code detector. The base station scrambling timing detector 2 judges which type of scrambling code is used by the selected base station, based on the frame boundary symbol corresponding to the selected base station, and informs the correlator with time window 4A about the type of the scrambling code used by the selected base station.

Figure 6:
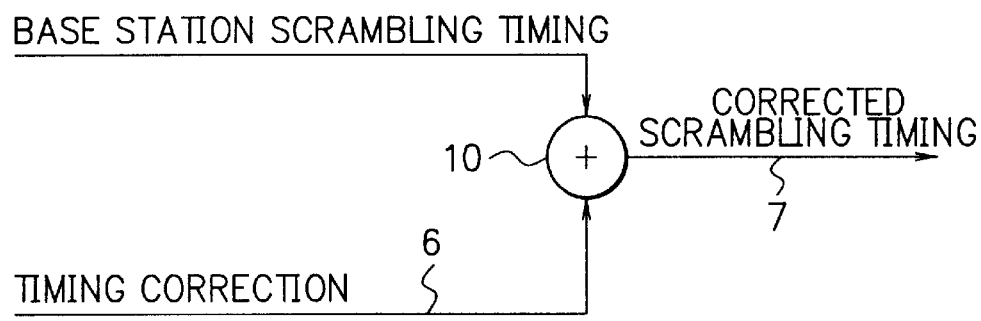
FIG. 6 is a schematic diagram showing an example of the composition of a timing corrector of the perch channel reception device of FIG. 3.

The timing corrector 3 adds the base station scrambling timing outputted by the base station scrambling timing detector 2 and the timing correction 6 outputted by the correlator with time window 4A together, and thereby obtains the corrected scrambling timing 7 with respect to the selected base station. FIG. 6 is a schematic diagram showing an example of the composition of the timing corrector 3, in which the timing corrector 3 is composed of an adder 10.

The correlator with time window 4A is a correlator which is provided with a time window for absorbing and compensating the shift of the scrambling timing of the mobile radio communication terminal (i.e. the corrected scrambling timing 7) from the real scrambling timing of the selected base station. In CDMA, signal reception generally becomes impossible if the scrambling timing of the mobile radio communication terminal shifted by 1 chip (chip: a time period corresponding to one scrambled code when logic data is scrambled), even if the scrambling code of the receiving side (i.e. the mobile radio communication terminal) matches that of the transmitting side (i.e. the selected base station). Even a scrambling timing shift of about ½ chip seriously deteriorates the reception gain. Therefore, the correlator of a mobile radio communication terminal according to CDMA is generally designed to have composition capable of absorbing and compensating the scrambling timing shift, in order to avoid the deterioration of reception status.

Figure 7:
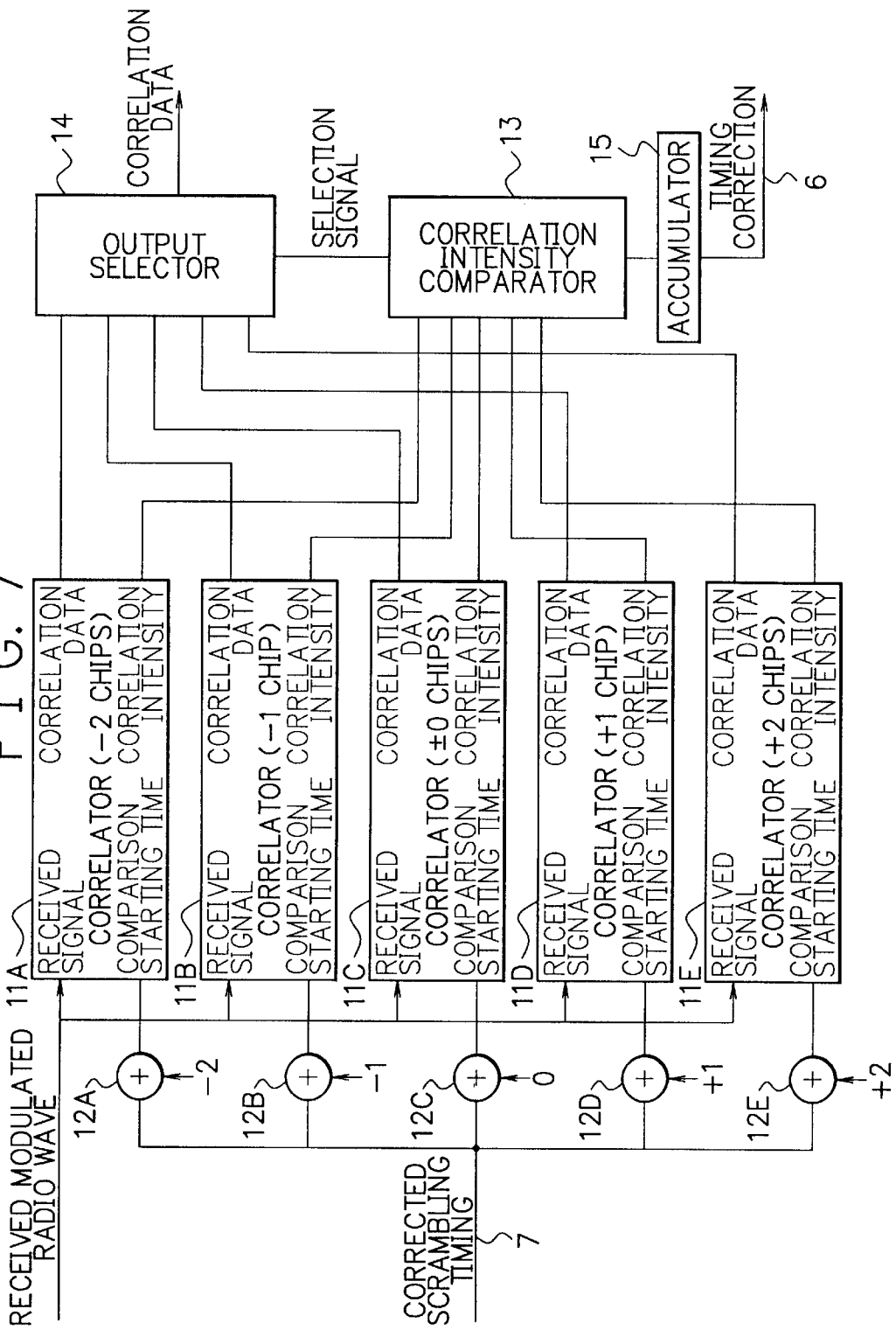
FIG. 7 is a block diagram showing an example of the composition of a correlator with time window of the perch channel reception device of FIG. 3.

FIG. 7 is a block diagram showing an example of the composition of the correlator with time window 4A, in the case where the correlator with time window 4A has a time window of ±2 chips. The correlator with time window 4A shown in FIG. 7 includes five correlators 11A~11E, five adders 12A~12E, a correlation intensity comparator 13, an output selector 14 and an accumulator 15. Five different comparison starting times (i.e. the time when the comparison between the received modulated radio wave and the base station scrambling code is started) are set to the five correlators 11A~11E. The corrected scrambling timing 7 supplied from the timing corrector 3 is shifter by the adders 12A~12E by -2 chips, -1 chip, ±0 chips, +1 chip and +2 chips respectively, and each shifted scrambling timing is supplied to a comparison starting time terminal of a corresponding correlator. Each correlator takes the correlation between (compares) the received modulated radio wave and the base station scrambling code detected by the base station scrambling timing detector 2 and thereby executes de-scrambling to the received modulated radio wave in sync with its own shifted scrambling timing (comparison starting time), and outputs the result as correlation data and correlation intensity. The correlation intensity comparator 13 executes comparison between the correlation intensity supplied from the five correlators 11A~11E, selects one correlator having the largest correlation intensity, and supplies a selection signal designating the selected correlator to the output selector 14. The output selector 14 is supplied with five correlation data from the five correlators 11A~11E, and selects correlation data that is supplied from the correlator designated by the selection signal supplied from the correlation intensity comparator 13. The correlation data selected by the output selector 14 is supplied to the perch channel demodulator 5. The correlation intensity comparator 13 also outputs timing shift data to the accumulator 15. The timing shift data is data which indicates the timing shift (-2 chips, -1 chip, ±0 chips, ±1 chip or +2 chips) of the adder (12A, 12B, 12C, 12D or 12E) corresponding to the selected correlator (11A, 11B, 11C, 11D or 11E). The accumulator 15 accumulates the timing shift data supplied from the correlation intensity comparator 13 and outputs the accumulated timing shift to the timing corrector 3 as the timing correction 6.

Figure 8:
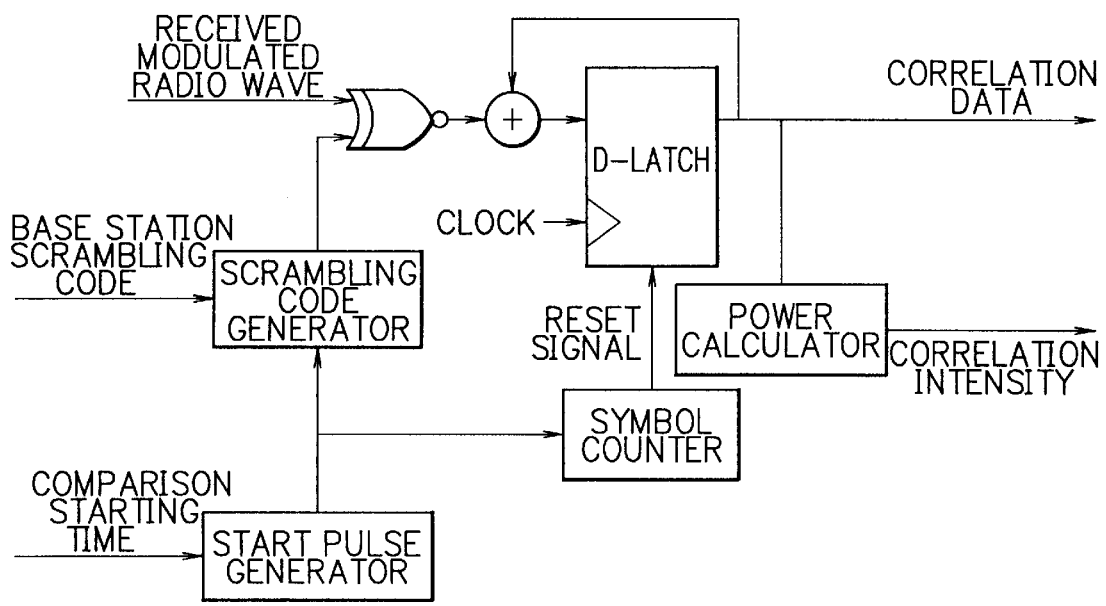
FIG. 8 is a block diagram showing an example of a correlator of correlator bank type.

Correlators can generally be divided into two types: correlator bank type and matched filter type. FIG. 8 is a block diagram showing an example of a correlator of the correlator bank type, and FIG. 9 is a block diagram showing an example of a correlator of the matched filter type.

The correlator bank type correlator of FIG. 8 takes the correlation between the received modulated radio wave and the base station scrambling code on every chip, and stores the correlation data in a register such as a D-latch. The correlation data stored in the register are read out on every symbol (256 chips, for example), and are supplied to the output selector 14 as the correlation data. The comparison starting time also means starting time of the base station scrambling code, therefore, a scrambling code generator of the correlator starts generating and outputting the base station scrambling code at the comparison starting time. Each bit of the base station scrambling code outputted by the scrambling code generator is successively compared with the received modulated radio wave by an EXNOR gate, and thereby the correlation is taken.

Figure 9:
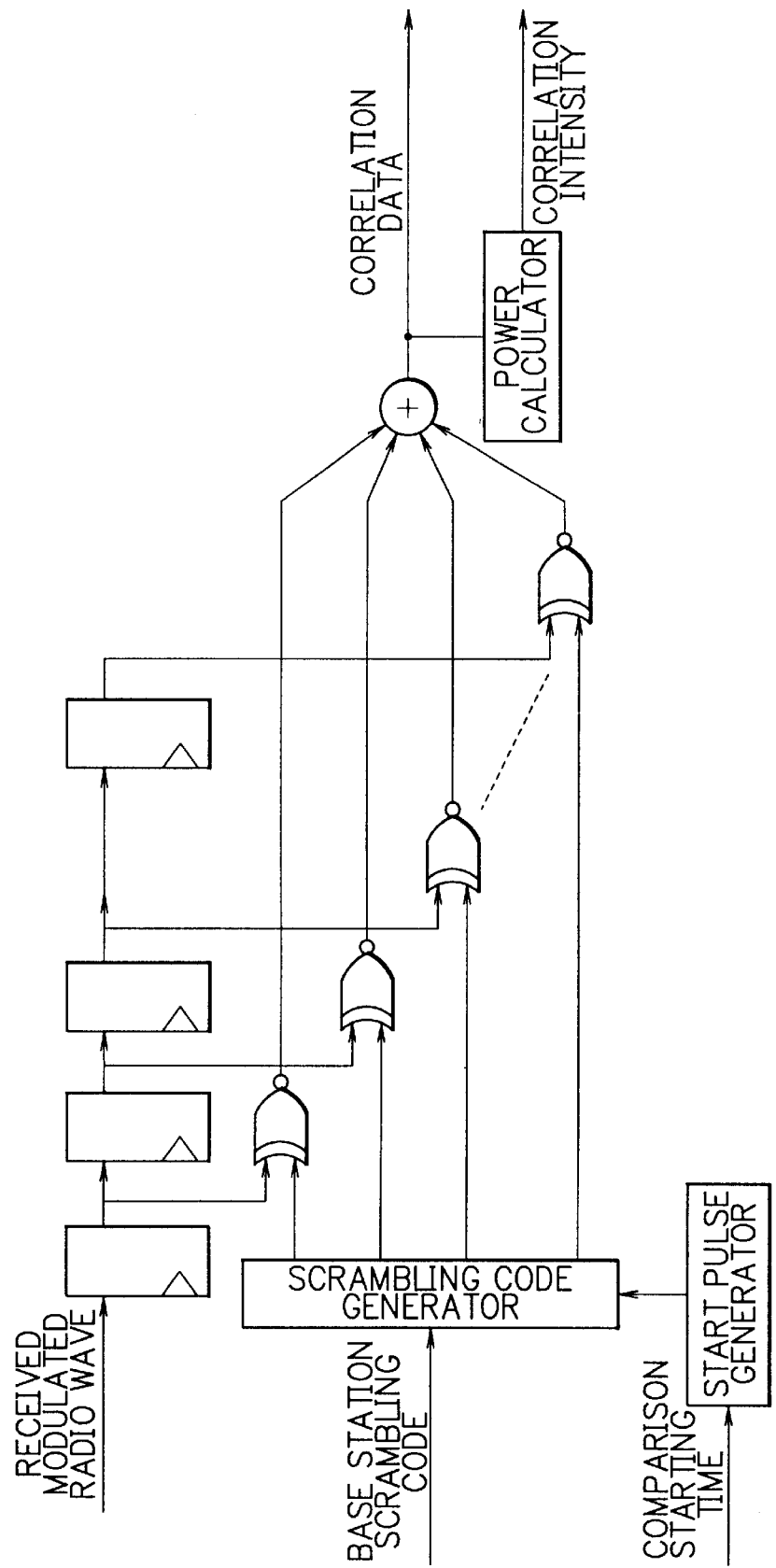
FIG. 9 is a block diagram showing an example of a correlator of matched filter type.

The matched filter type correlator of FIG. 9 has a shift register for temporarily storing the received modulated radio wave corresponding to one symbol (256 chips, for example). Each EXNOR gate shown in FIG. 9 takes the correlation between the output of a corresponding stage of the shift register (D-latch, for example) and each bit of the base station scrambling code outputted by a scrambling code generator. The correlation data is obtained by adding the outputs of the EXNOR gates together. The base station scrambling code is updated on every symbol. The comparison starting time is used as the starting time of the update cycle.

Either the correlator bank type correlator of FIG. 8 or the matched filter type correlator of FIG. 9 can be employed as the correlator in the correlator with time window 4A of the embodiment.

In the following, the operation of the perch channel reception device according to the embodiment of the present invention will be described referring to figures.

Figure 10:
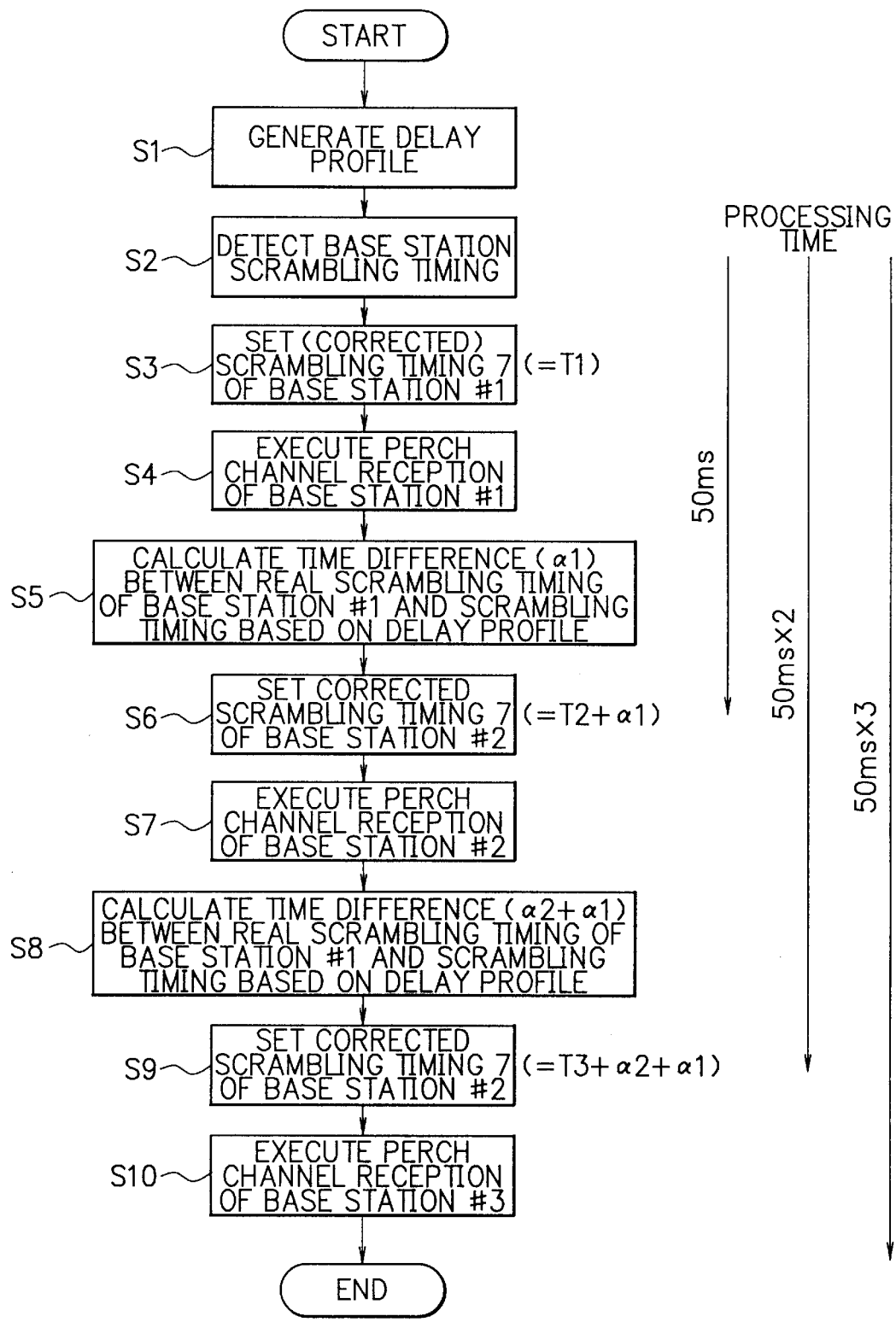
FIG. 10 is a flow chart showing the operation of the perch channel reception device of FIG. 3 until the perch channel reception device completes reception of perch channels of three base stations.

First, a case where the perch channel reception device receives perch channels of three base stations #1, #2 and #3 around the mobile radio communication terminal will be explained referring to FIG. 10. FIG. 10 is a flow chart showing the operation of the perch channel reception device of FIG. 3 until the perch channel reception device completes reception of the perch channels of the three base stations #1, #2 and #3.

In step S1, the delay profile generator 1 detects frame boundary symbols included in the received modulated radio wave, and thereby generates a delay profile of the base stations around the mobile radio communication terminal. In step S2, the base station scrambling timing detector 2 detects scrambling timing of each of the base stations using the delay profile generated by the delay profile generator 1, and generates a scrambling timing table indicating scrambling timing of each of the base stations #1, #2 and #3. Incidentally, the base stations #1, #2 and #3 are unidentified base stations at this stage, as mentioned before. The delay profile generation and the base station scrambling timing detection of the steps S1 and S2 are executed only once prior to the other steps of FIG. 10. Thereafter, the base station scrambling timing detector 2 having the function of the sequencer successively selects a base station from the base stations in order to execute perch channel reception of the base stations one by one, and supplies the detected scrambling timing of the selected base station (base station scrambling timing) to the timing corrector 3.

For example, when the base station scrambling timing detector 2 as the sequencer selected the (unidentified) base station #1 first, the base station scrambling timing of the base station #1 is supplied to the timing corrector 3 to be corrected using the timing correction 6 supplied from the correlator with time window 4A, and the corrected scrambling timing 7 of the base station #1 is supplied to the correlator with time window 4A, thereby the corrected scrambling timing 7 of the base station #1 is set to the correlator with time window 4A (step S3). Thereafter, perch channel reception of the base station #1 is started (step S4). Incidentally, in the first perch channel reception (with respect to the base station #1 in this example), the timing corrector 3 sends the base station scrambling timing of the base station #1 to the correlator with time window 4A without executing correction (since the timing correction 6 is 0) as the corrected scrambling timing 7. The perch channel reception of a base station needs a reception time of 50 ms for obtaining necessary information concerning the base station.

When the perch channel reception of the base station #1 is completed, the correlator with time window 4A calculates the time difference between real scrambling timing of the base station #1 and the scrambling timing based on the delay profile (i.e. the base station scrambling timing outputted by the base station scrambling timing detector 2) as explained before (step S5), and sends information concerning the time difference $\alpha 1$ to the timing corrector 3 as the timing correction 6.

Subsequently, the timing corrector 3 receives scrambling timing of the base station #2 (, for example) from the base station scrambling timing detector 2, corrects the scrambling timing of the base station #2 using the timing correction 6 ($\alpha 1$), and sends the corrected scrambling timing 7 to the correlator with time window 4A, thereby the corrected scrambling timing 7 of the base station #2 is set to the correlator with time window 4A (step S6). Therefore, in the next perch channel reception with respect to the next base station #2 (step S7), the correlation data is taken based on the corrected scrambling timing 7, that is, timing which is different from the scrambling timing of the base station #2 detected by the base station scrambling timing detector 2 by the time difference $\alpha 1$. The perch channel reception of the base station #2 is also completed in 50 ms.

When the perch channel reception of the base station #2 is completed, the correlator with time window 4A calculates the time difference ($\alpha 2$) between real scrambling timing of the base station #2 and the corrected scrambling timing 7 of the base station #2, thereby obtains the time difference ($\alpha 2 + \alpha 1$) between real scrambling timing of the base station #2 and the scrambling timing based on the delay profile (i.e. the base station scrambling timing of the base station #2 detected by the base station scrambling timing detector 2) as described before (step S8), and sends information concerning the time difference ($\alpha 2 + \alpha 1$) to the timing corrector 3 as the timing correction 6.

Figure 11:
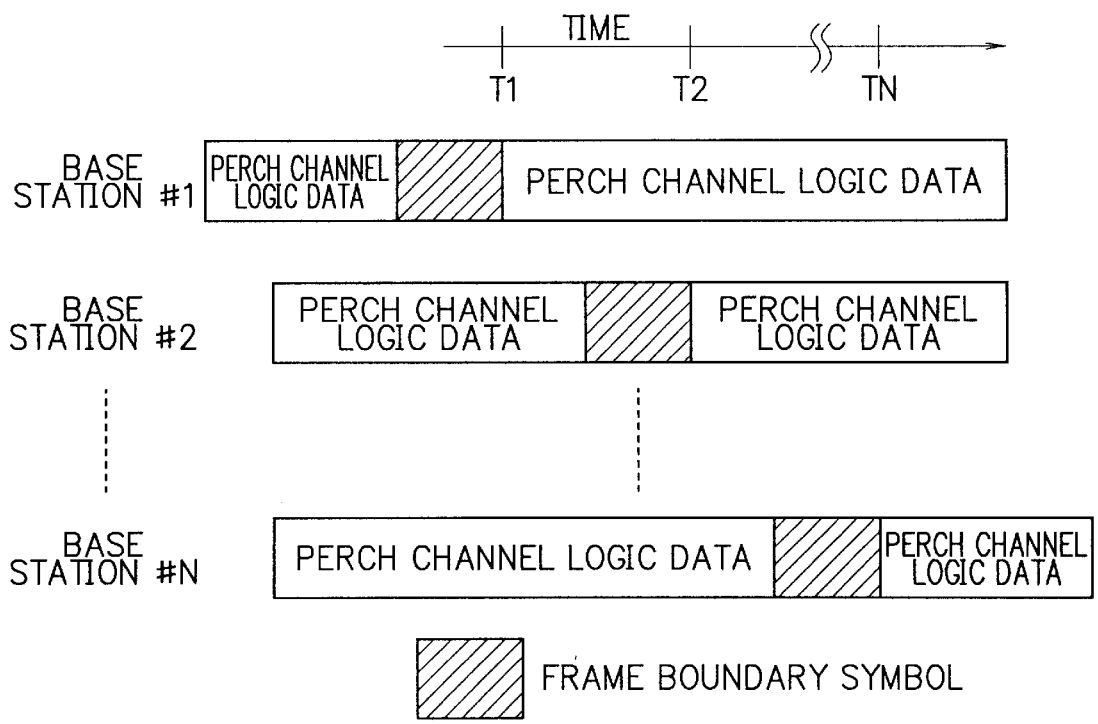
FIG. 11 is a timing chart showing scrambling timing of a perch channel of each base station in the case where there are N base stations around the mobile radio communication terminal.
Figure 12:
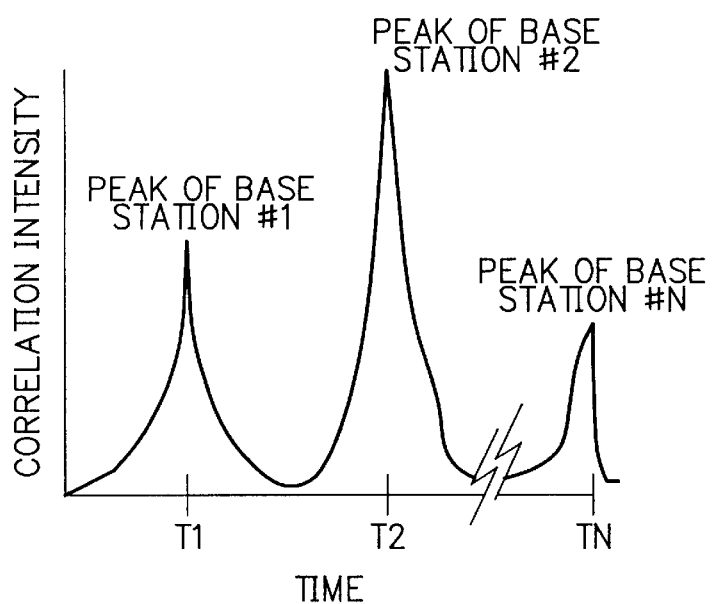
FIG. 12 is a graph showing an example of a delay profile which is generated by the delay profile generator in the case where there are N base stations around the mobile radio communication terminal.
Figure 13:
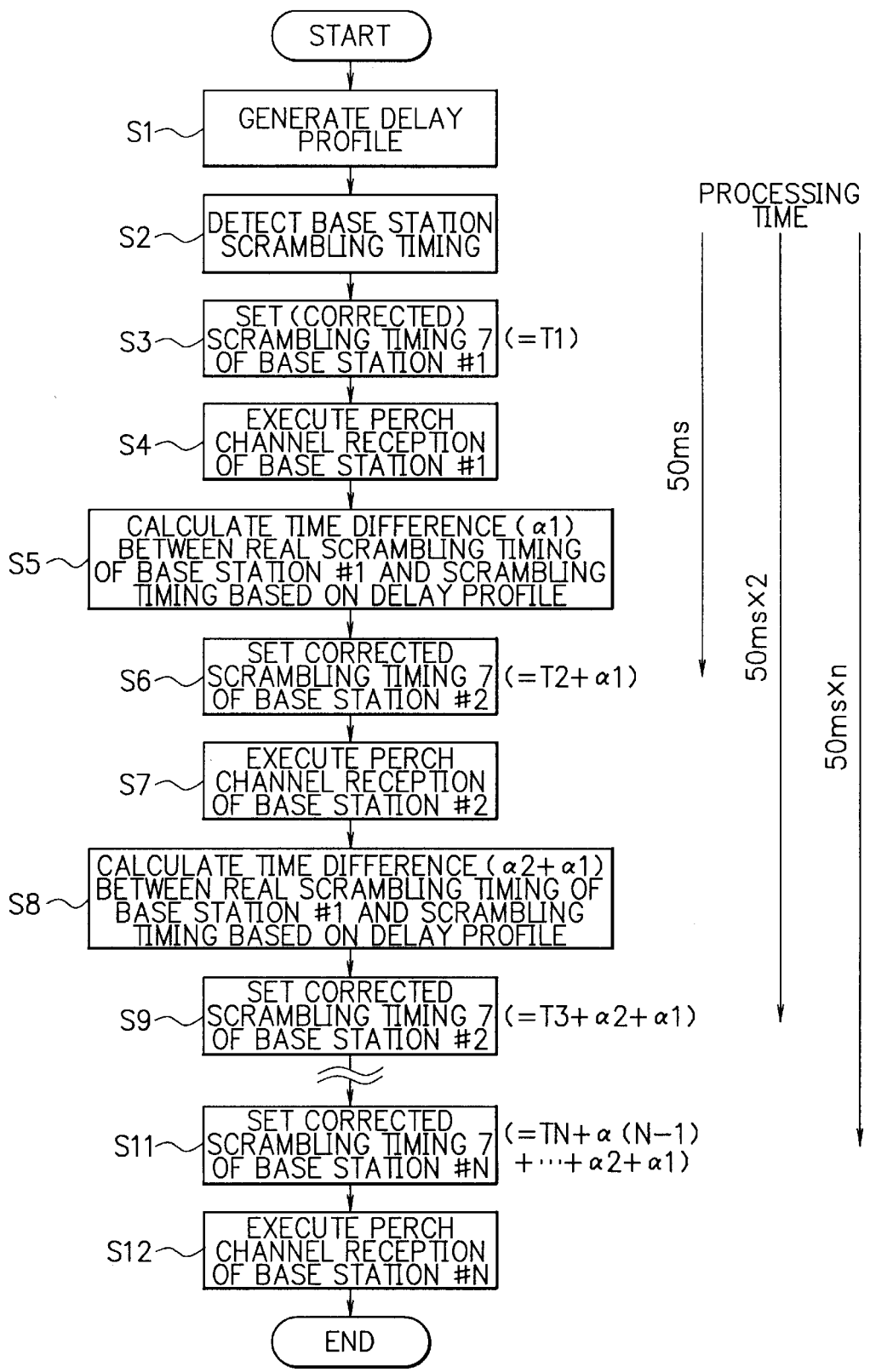
FIG. 13 is a flow chart showing the operation of the perch channel reception device of FIG. 3 until the perch channel reception device completes reception of perch channels of N base stations.

Subsequently, the timing corrector 3 receives scrambling timing of the base station #3 (, for example) from the base station scrambling timing detector 2, corrects the scrambling timing of the base station #3 using the timing correction 6 ($\alpha 2 + \alpha 1$), and sends the corrected scrambling timing 7 to the correlator with time window 4A, thereby the corrected scrambling timing 7 of the base station #3 is set to the correlator with time window 4A (step S9). Therefore, in the next perch channel reception with respect to the next base station #3 (step S10), the correlation data is taken based on the corrected scrambling timing 7, that is, timing which is different from the scrambling timing of the base station #3 detected by the base station scrambling timing detector 2 by the time difference ($\alpha 1 + \alpha 2$). The perch channel reception of the base station #3 is also completed in 50 ms, and thereby the whole reception of the perch channels of the base stations #1, #2 and #3 is completed. Incidentally, while a case where the number of the base stations around the mobile radio communication terminal is three has been described above, the perch channel reception device of the embodiment operates similarly when the number of base station is 2, or 4 or more. FIG. 11 is a timing chart showing the scrambling timing of the perch channel of each base station, in the case where there are N base stations around the mobile radio communication terminal. FIG. 12 is a graph showing an example of a delay profile which is generated by the delay profile generator 1 by detecting the frame boundary symbols included in the perch channels transmitted by the N base stations. FIG. 13 is a flow chart showing the operation of the perch channel reception device of FIG. 3 until the perch channel reception device completes reception of the perch channels of the N base stations.

As described above, in the perch channel reception device according to the embodiment of the present invention, on each completion of perch channel reception of a base station, the correlator with time window 4A detects the time difference between real scrambling timing of the currently received base station and the corrected scrambling timing 7 (which has been used for the perch channel reception of the currently received base station) and thereby calculates the timing correction 6 (which indicates the time difference between the real scrambling timing of the currently received base station and the scrambling timing of the currently received base station which has been detected by the base station scrambling timing detector 2 based on the delay profile) as the accumulation of the time difference. The timing corrector 3 generates a corrected scrambling timing 7 for the next perch channel reception of the next base station, based on the base station scrambling timing of the next base station supplied from the base station scrambling timing detector 2 and the timing correction 6 supplied from the correlator with time window 4A. Thereafter, the correlator with time window 4A generates correlation data with respect to the next base station based on the corrected scrambling timing 7. The above processes are repeated for all the base stations around the mobile radio communication terminal (that is, for all the peaks detected in the delay profile).

Therefore, the time window of the correlator with time window 4A is only required to absorb and compensate the shift of the scrambling timing (due to the difference between scrambling frequencies of the mobile radio communication terminal and the base stations) which occurs in perch channel reception with respect to one base station, and thus the size of the time window of the correlator with time window 4A can be much smaller than that of the conventional perch channel reception device of FIG. 1. Therefore, the number of the correlators of the correlator with time window 4A can be much decreased in comparison with the case of the correlator with time window 4 of the conventional perch channel reception device, and thereby circuit scale of the correlator with time window 4A can be reduced much.

As set forth hereinabove, in the perch channel reception device and the perch channel reception method according to the present invention, the time difference between real scrambling timing of a currently received base station and scrambling timing which has been used for executing perch channel reception of the currently received base station is detected and a timing correction is calculated as the accumulation of the time difference and thereby scrambling timing of the next base station which has been detected based on a delay profile is corrected using the timing correction, on each completion of perch channel reception of a base station, and perch channel reception of the next base station is executed using the corrected scrambling timing of the next base station. Therefore, the time window of the mobile radio communication terminal is only needed to cover the scrambling timing shift in the perch channel reception with respect to one base station (50 ms, for example), and thus the size of the time window can considerably be decreased and circuit scale of the mobile radio communication terminal can be reduced much. Manufacturing cost and the price of the mobile radio communication terminal can be lowered.

For example, in the case where the scrambling frequency (chip frequency) is 4 MHz and the perch channel reception time for one base station is 50 ms and the oscillator frequency error of the mobile radio communication terminal is ±3 PPM, the size of the time window of the correlator with time window 4A in the above embodiment can be as little as ±0.6 chips, since the scrambling timing calculated based on the delay profile is corrected by the timing correction 6 on every completion of perch channel reception of a base station and the corrected scrambling timing 7 is used by the correlator with time window 4A.

Further, by the perch channel reception device and the perch channel reception method according to the present invention, the time window of the mobile radio communication terminal is not needed to be enlarged even if the number of base stations around the mobile radio communication terminal (i.e. the number of peaks of the delay profile) becomes very large, differently from the case of the conventional perch channel reception device of FIG. 1. Therefore, a mobile radio communication terminal which can successively execute perch channel reception of a large number of base stations by use of a time window of a small circuit scale can be realized.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A perch channel reception device of a mobile radio communication terminal according to CDMA (Code Division Multiple Access) for successively receiving perch channels transmitted by base stations around the mobile radio communication terminal, said perch channel reception device comprising:

a receiving circuit receiving a modulated signal from a plurality of base stations, wherein:

on each completion of perch channel reception of a base station, a time difference between a real scrambling timing of a currently-received base station and a scrambling timing which has been used for executing a perch channel reception of the currently-received base station is detected; and a timing correction is calculated as an accumulation of the time difference thereby correcting a scrambling timing of the next base station which has been detected based on a delay profile, and perch channel reception of the next base station is executed using the corrected scrambling timing of the next base station.

2. A perch channel reception device as claimed in claim 1, further comprising:

a correlator with time window for detecting the time difference between the real scrambling timing of the currently-received base station and the scrambling timing which has been used for executing perch channel reception of the currently-received base station, said correlator with time window further generating a correlation data with respect to the currently-received base station by taking the correlation between a received modulated radio wave and scrambling code of the currently-received base station with respect to a plurality of comparison starting times in a time window around the corrected scrambling timing which is used for the perch channel reception of the currently-received base station.

3. A perch channel reception device as claimed in claim 2, further comprising:

a timing corrector for calculating the corrected scrambling timing of the next base station using the scrambling timing of the next base station which has been detected based on the delay profile and the accumulation of the time difference detected by the correlator with time window, and supplying the corrected scrambling timing of the next base station to the correlator with time window so as to be used for the perch channel reception of the next base station.

4. A perch channel reception device as claimed in claim 1, further comprising:

a delay profile generator for detecting frame boundary symbols which are included in a received modulated radio wave and thereby generating the delay profile of base stations around the mobile radio communication terminal;

a base station scrambling timing detector for detecting scrambling timing of each of the base stations based on the delay profile which has been generated by the delay profile generator;

a base station scrambling code detector for detecting the type of scrambling code of each of the base stations based on the frame boundary symbols which have been detected by the delay profile generator;

a sequencer for selecting a base station from the base stations one by one as the object of perch channel reception;

a timing corrector for calculating corrected scrambling timing of the selected base station using the scrambling timing of the selected base station which has been detected by the base station scrambling timing detector and the timing correction;

a correlator with time window for taking the correlation between the received modulated radio wave and the scrambling code of the selected base station which has been detected by the base station scrambling code detector with respect to a plurality of comparison starting times in a time window around the corrected scrambling timing of the selected base station and thereby generating correlation data with respect to the selected base station, while detecting a time difference between a real scrambling timing and the corrected scrambling timing of the selected base station and thereby calculating a time difference between the real scrambling timing of the selected base station and the scrambling timing of the selected base station which has been detected by the base station scrambling timing detector and supplying the time difference to the timing corrector as the timing correction when perch channel reception of the selected base station is completed; and a perch channel demodulator for demodulating the correlation data generated by the correlator with time window into logic data including information concerning the selected base station.

5. A perch channel reception device as claimed in claim 4, wherein the correlator with time window comprises:

three or more correlators, to which different comparison starting times in the time window around the corrected scrambling timing of the selected base station are set respectively, and each of which takes the correlation between the received modulated radio wave and the scrambling code of the selected base station in sync with its comparison starting time and thereby outputs correlation data and correlation intensity;

a correlation intensity comparator for executing comparison between the correlation intensity supplied from the correlators, selecting one correlator having the largest correlation intensity, and outputting a selection signal designating the selected correlator, while outputting timing shift data indicating the time difference between real scrambling timing and the corrected scrambling timing of the selected base station;

an output selector which is supplied with the correlation data from the correlators, for selecting correlation data that is supplied from the correlator designated by the selection signal supplied from the correlation intensity comparator and outputting the selected correlation data to the perch channel demodulator; and an accumulator for accumulating the timing shift data supplied from the correlation intensity comparator and supplying the accumulated timing shift to the timing corrector as the timing correction.

6. A perch channel reception device as claimed in claim 5, wherein each of the correlators included in the correlator with time window is implemented by a correlator of correlator bank type.

7. A perch channel reception device as claimed in claim 5, wherein each of the correlators included in the correlator with time window is implemented by a correlator of matched filter type.

8. A perch channel reception device as claimed in claim 4, wherein the timing corrector is implemented by an adder for adding the timing correction supplied from the correlator with time window to the scrambling timing of the selected base station which has been detected by the base station scrambling timing detector.

9. A perch channel reception method of a mobile radio communication terminal according to CDMA (Code Division Multiple Access) for successively receiving perch channels transmitted by base stations around the mobile radio communication terminal, said method comprising:

on each completion of perch channel reception of a base station:
detecting a time difference between real scrambling timing of a currently-received base station and scrambling timing which has been used for executing perch channel reception of the currently-received base station;
calculating a timing correction as an accumulation of the time difference;
using the timing correction to correct a scrambling timing of a next base station, said scrambling time having been detected based on a delay profile; and
executing a perch channel reception of the next base station using the corrected scrambling timing.

10. A perch channel reception method as claimed in claim 9, further comprising:

generating a delay profile by detecting frame boundary symbols included in a received modulated radio wave, thereby generating the delay profile of base stations around the mobile radio communication terminal;

based on the delay profile, detecting a base station scrambling timing of each of the base stations;

based on said frame boundary symbols detected during said generating of the delay profile, detecting a base station scrambling code type of each of the base station;

selecting a base station one by one from the base stations as the object of a perch channel reception;

using the scrambling timing of the selected base station which has been detected in the base station scrambling timing detection and the timing correction, calculating a corrected scrambling timing of the selected base station;

receiving a perch channel, during which reception a correlation between a received modulated radio wave and the scrambling code of the selected base station is taken with respect to a plurality of comparison starting times in a time window around the corrected scrambling timing of the selected base station, thereby generating a correlation data with respect to the selected base station;

when the perch channel reception of a selected base station is completed, calculating a timing correction by detecting a time difference between real scrambling timing and the corrected scrambling timing of the selected base station, said timing correction indicating a time difference between the real scrambling timing of the selected base station and the scrambling timing of the selected base station detected from said delay profile; and demodulating the correlation data into logic data including information concerning the selected base station.

11. A computer-readable record medium storing a program for instructing a computer or a DSP (digital signal processor) of a mobile radio communication terminal according to CDMA (Code Division Multiple Access) to execute processes for successively receiving perch channels transmitted by base stations around the mobile radio communication terminal, said processes comprising:

on each completion of perch channel reception of a base station, detecting a time difference between a real scrambling timing of a currently-received base station and a scrambling timing which has been used for executing perch channel reception of the currently-received base station;

calculating a timing correction as an accumulation of the time difference;

using the timing correction, correcting a scrambling timing of a next base station, said scrambling timing having been detected based on a delay profile; and using the corrected scrambing timing, executing a perch channel reception of the next base station.

12. A computer-readable record medium as claimed in claim 11, said processes further comprising:

generating a delay profile by detecting frame boundary symbols in a received modulated radio wave, thereby generating a delay profile of base stations around the mobile radio communication terminal;

based on the delay profile, detecting a scrambling timing of each of the base stations;

based on the frame boundary symbols, detecting a type of scrambling code of each of the base stations;

selecting one by one a base station as an object of perch channel reception;

using the timing correction and the scrambling timing of the selected base station detected in said delay profile, calculating a corrected scrambling timing of the selected base station;

during a perch channel reception, taking a correlation between the received modulated radio wave and the scrambling code of the selected base station, said correlation taken with respect to a plurality of comparison starting times in a time window around the corrected scrambling timing of the selected base station, thereby generating a correlation data with respect to the selected base station;

calculating a timing correction when said perch channel reception is completed by detecting a time difference between a real scrambling timing and the corrected scrambling timing of the selected base station during the perch channel reception, the timing correction indicating a time difference between the real scrambling timing of the selected base station and the scrambling timing of the selected base station which had been detected from said delay profile; and demodulating the correlation data generated in the perch channel reception into logic data including information concerning the selected base station.

13. A CDMA (Code Division Multiple Access) mobile radio communication terminal, said mobile radio communication terminal comprising:

a perch channel reception circuit including a timing corrector to successively correct a perch channel scrambling timing for each successive base station, as based on a perch channel scrambling timing of a currently-received base station; and a time window correlator receiving a corrected scrambled timing signal from said timing corrector, wherein said time window correlator further provides a timing correction signal to said timing corrector.

* * * * *